(No Model.)
R. F. SWAN.
Spark Arrester.
No. 233,171. Patented Oct. 12, 1880.
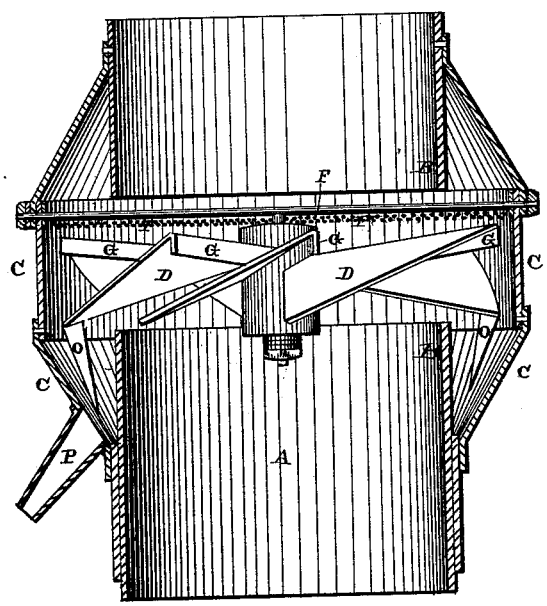
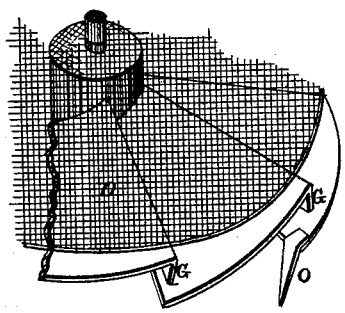
Witnesses
Wm. W. Mortimer
Will H. Law
Inventor
R. F. Swan,
per
F. A. Lehmann,
Atty.

UNITED STATES PATENT OFFICE.

ROBERT F. SWAN, OF MOUNT PLEASANT, TEXAS.

SPARK-ARRESTER.

SPECIFICATION forming part of Letters Patent No. 233,171, dated October 12, 1880.

Application filed August 30, 1880. (No model.)

*To all whom it may concern:*

Be it known that I, R. F. SWAN, of Mount Pleasant, in the county of Titus and State of Texas, have invented certain new and useful Improvements in Spark-Arresters; and I do hereby declare the following to be a full, clear, and exact description of the invention, such as will enable others skilled in the art to which it pertains to make and use it, reference being had to the accompanying drawings, which form part of this specification.

My invention relates to an improvement in spark-arresters; and it consists in placing inside of the stack, just above and below the revolving wheel, a vertical wall, there being a space left between the inner edges of these two walls, so that the wheel in revolving will catch the sparks and throw them outward against the sides of the stack, and thus cause them to drop into the chamber formed by these walls.

It further consists in securing to the outer edge of the wheel two or more vertical arms, which extend down into the chamber into which the sparks fall, for the purpose of forcing them around to a discharge-tube, through which the sparks or cinders may be conducted to any desired point.

The object of my invention is to form a chamber in the side of the stack, and then by turning down the edges of each blade of the revolving wheel form horizontal flanges, which will catch the sparks as they rise upward and throw them outward into the chamber, which extends all around the edge of the wheel, where they will be extinguished.

Figure 1 is a vertical section of my invention. Fig. 2 is an edge view of the wheel which is placed in the stack.

A represents the stack, which may be of any desired construction, and which has secured to the inside of its enlarged upper end the two vertical walls B. The edges of these two walls reach within a short distance of the upper and lower sides of the revolving wheel D, which is placed in the stack, and form the chamber C, into which the sparks are thrown by the action of the wheel. Extending horizontally across the stack is a rod, F, upon which the wheel D is journaled in any suitable manner. This wheel is formed like a propeller-wheel, and has the inner edge of each blade turned vertically downward, so as to form a flange, G. This wheel being placed just opposite the opening around the inside of the chamber, and being made to revolve by the upward draft, these flanges catch the rising sparks and throw them with great force against the outer side of the chamber. After these sparks are thrown beyond the edges of the vertical walls B they are entirely beyond the influence of the upward draft, and so drop downward into the chamber C. Where these flanges are not formed upon the edges of the blades the wheel exerts but comparatively little influence upon the sparks so far as extinguishing them goes, but where the flanges are formed they serve to catch the sparks and throw them outward with great force. Also, secured to this wheel, just above it, is a suitable screen, I, which revolves around with the wheel inside of the stack and serves to catch those sparks which may be carried by the blast up above the wheel.

By attaching the screen to the wheel so that the two revolve together the screen is made to shake and vibrate in such a manner as to constantly clear itself of the sparks, and thus prevent it from being clogged up.

Secured to the lower outer corner of any desired number of blades of the wheel are the arms or projections O, which are made of the same shape as the bottom of the chamber C, and which arms or projections, as the wheel sweeps around, serve to move the cinders and sparks which have been thrown into the chamber around to the discharge-pipe P, through which pipe the cinders and sparks may be conveyed to any desired place.

Having thus described my invention, I claim—

1. In a spark-arrester, the revolving wheel D, having its blades provided with horizontal flanges upon one of their edges for the purpose of catching the sparks and throwing them outward, substantially as shown.

2. In a spark-arrester, the combination of a revolving wheel which is placed in the stack and operated by the draft with a revolving screen which is secured to and operated by the said wheel, arranged substantially as described.

3. In a locomotive smoke-stack, the chamber C, formed by means of the vertical wall B and inclined wall C, in combination with a horizontally-revolving wheel, for the purpose of throwing the sparks outward into this chamber, the edges of the wheel being made to extend beyond and in between the walls, substantially as set forth.

4. In a spark-arrester, the combination of the chamber C and a revolving wheel provided with the arms or projections for sweeping the sparks and cinders in the bottom of the chamber to the discharge-pipe, substantially as specified.

In testimony that I claim the foregoing I have hereunto set my hand this 23d day of August, 1880.

ROBERT F. SWAN.

Witnesses:
WILLIAM H. CHRISTIAN,
CHARLIE C. CARR.